United States Patent
Vienravee

(10) Patent No.: US 11,797,989 B2
(45) Date of Patent: *Oct. 24, 2023

(54) SYSTEMS AND METHODS FOR USE IN VERIFYING RECURRING TRANSACTIONS TO PAYMENT ACCOUNTS

(71) Applicant: MASTERCARD INTERNATIONAL INCORPORATED, Purchase, NY (US)

(72) Inventor: Brian Vienravee, St. Louis, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 254 days.

This patent is subject to a terminal disclaimer.

(21) Appl. No.: 16/275,434

(22) Filed: Feb. 14, 2019

(65) Prior Publication Data

US 2019/0180277 A1 Jun. 13, 2019

Related U.S. Application Data

(63) Continuation of application No. 14/948,523, filed on Nov. 23, 2015, now Pat. No. 10,210,515.

(51) Int. Cl.
*G06Q 40/00* (2023.01)
*G06Q 20/40* (2012.01)
(Continued)

(52) U.S. Cl.
CPC ......... *G06Q 20/401* (2013.01); *G06Q 20/325* (2013.01); *G06Q 20/405* (2013.01); *G06Q 20/42* (2013.01)

(58) Field of Classification Search
CPC .... G06Q 20/401; G06Q 20/42; G06Q 20/325; G06Q 20/405
See application file for complete search history.

(56) References Cited

U.S. PATENT DOCUMENTS 6,327,578 B1 * 12/2001 Linehan ................ G06Q 20/02
713/172
10,269,009 B1 * 4/2019 Winklevoss ....... G06Q 20/3674
(Continued)

FOREIGN PATENT DOCUMENTS

CA 2763001 A1 11/2010
CA 2891432 A1 7/2014
(Continued)

OTHER PUBLICATIONS

Mare et al: "ZEBRA: Zero-Effort Bilateral Recurring Authentication", IEEE Symposium on Security and Privacy, May 18-21, 2014 (Year: 2014).*

(Continued)

*Primary Examiner* — Edward J Baird
(74) *Attorney, Agent, or Firm* — Harness, Dickey & Pierce, P.L.C.

(57) ABSTRACT

Systems and methods are provided for verifying recurring transactions to payment accounts. One exemplary method includes initially receiving an authorization request for a transaction to a payment account and involving a merchant, where the authorization request includes a recurring payment indicator. The method also generally includes transmitting, by at least one computing device, a verification request to a consumer associated with the payment account, and inhibiting, by the at least one computing device, at least one or authorization or clearing of the transaction until a verification of the transaction, based on a direction from the consumer, is recognized, whereby the consumer is able to verify the transaction before the transaction is cleared.

14 Claims, 5 Drawing Sheets

(51) Int. Cl.
*G06Q 20/42* (2012.01)
*G06Q 20/32* (2012.01)

(56) References Cited

U.S. PATENT DOCUMENTS

| | | | |
|---|---|---|---|
| 2003/0120554 A1* | 6/2003 | Hogan | G06Q 30/06 |
| | | | 705/64 |
| 2007/0061257 A1* | 3/2007 | Neofytides | G06Q 20/1085 |
| | | | 705/40 |
| 2007/0198403 A1 | 8/2007 | Aloni et al. | |
| 2008/0040274 A1 | 2/2008 | Uzo | |
| 2008/0288405 A1 | 11/2008 | John | |
| 2009/0112746 A1* | 4/2009 | Fong | G06Q 40/00 |
| | | | 705/35 |
| 2009/0299853 A1 | 12/2009 | Jones et al. | |
| 2010/0088204 A1* | 4/2010 | Nambiar | G06Q 20/40 |
| | | | 705/400 |
| 2010/0205077 A1* | 8/2010 | Hammad | G06Q 40/12 |
| | | | 709/224 |
| 2010/0280914 A1* | 11/2010 | Carlson | G06Q 20/40 |
| | | | 705/26.35 |
| 2010/0299230 A1 | 11/2010 | Patterson et al. | |
| 2011/0251952 A1* | 10/2011 | Kelly | G06Q 20/102 |
| | | | 705/40 |
| 2011/0276489 A1 | 11/2011 | Larkin | |
| 2012/0011063 A1* | 1/2012 | Killian | G06Q 20/349 |
| | | | 705/41 |
| 2012/0265683 A1 | 10/2012 | da Silva et al. | |
| 2013/0018792 A1 | 1/2013 | Casey et al. | |
| 2013/0232073 A1* | 9/2013 | Sheets | H04L 9/3231 |
| | | | 705/44 |
| 2013/0246132 A1 | 9/2013 | Buie | |
| 2014/0101034 A1* | 4/2014 | Tanner | G06Q 20/10 |
| | | | 705/39 |
| 2014/0358769 A1* | 12/2014 | Howe | G06Q 20/382 |
| | | | 705/39 |
| 2016/0210628 A1 | 7/2016 | McGuire | |
| 2017/0091764 A1* | 3/2017 | Lloyd | G06Q 20/401 |
| 2017/0148020 A1 | 5/2017 | Vienravee | |

FOREIGN PATENT DOCUMENTS

| | | | |
|---|---|---|---|
| CA | 2939377 C * | 3/2020 | G06K 19/07 |
| CN | 101131759 A | 2/2008 | |
| CN | 101523428 A | 9/2009 | |
| CN | 101719250 A | 12/2009 | |
| CN | 102165472 A | 8/2011 | |
| CN | 102983973 A | 3/2013 | |
| CN | 103903138 A | 7/2014 | |
| WO | WO2017/091553 | 6/2017 | |

OTHER PUBLICATIONS

Lee: "MasterCard lays out strategy: [2* Edition]", New Straits Times; Kuala Lumpur, Mar. 2002.

* cited by examiner

SYSTEMS AND METHODS FOR USE IN VERIFYING RECURRING TRANSACTIONS TO PAYMENT ACCOUNTS

CROSS-REFERENCE TO RELATED APPLICATION

This application is a continuation of U.S. patent application Ser. No. 14/948,523 filed Nov. 23, 2015. The entire disclosure of the above application is incorporated herein by reference.

FIELD

The present disclosure generally relates to systems and methods for verifying recurring transactions to payment accounts and, in particular, for transmitting verification requests to consumers associated with payment accounts to which recurring transactions are directed and inhibiting at least clearing of the recurring transactions unless responses from the consumers are received/recognized.

BACKGROUND

This section provides background information related to the present disclosure which is not necessarily prior art.

Consumers use payment accounts to purchase various different products (e.g., good and services, etc.). The purchases may be single purchases of products, or alternatively, multiple recurring purchases of the same or different products. It is known for consumers to provide payment account details to merchants, and further to authorize the merchants to charge the payment accounts for products at one or more regular intervals. For example, auto-payment for cable services, loan payments, utilities, etc. are known, whereby consumers provide authorization for monthly charges to banking accounts and/or payment accounts associated with the consumers.

DRAWINGS

The drawings described herein are for illustrative purposes only of selected embodiments and not all possible implementations, and are not intended to limit the scope of the present disclosure.

Figure 1:
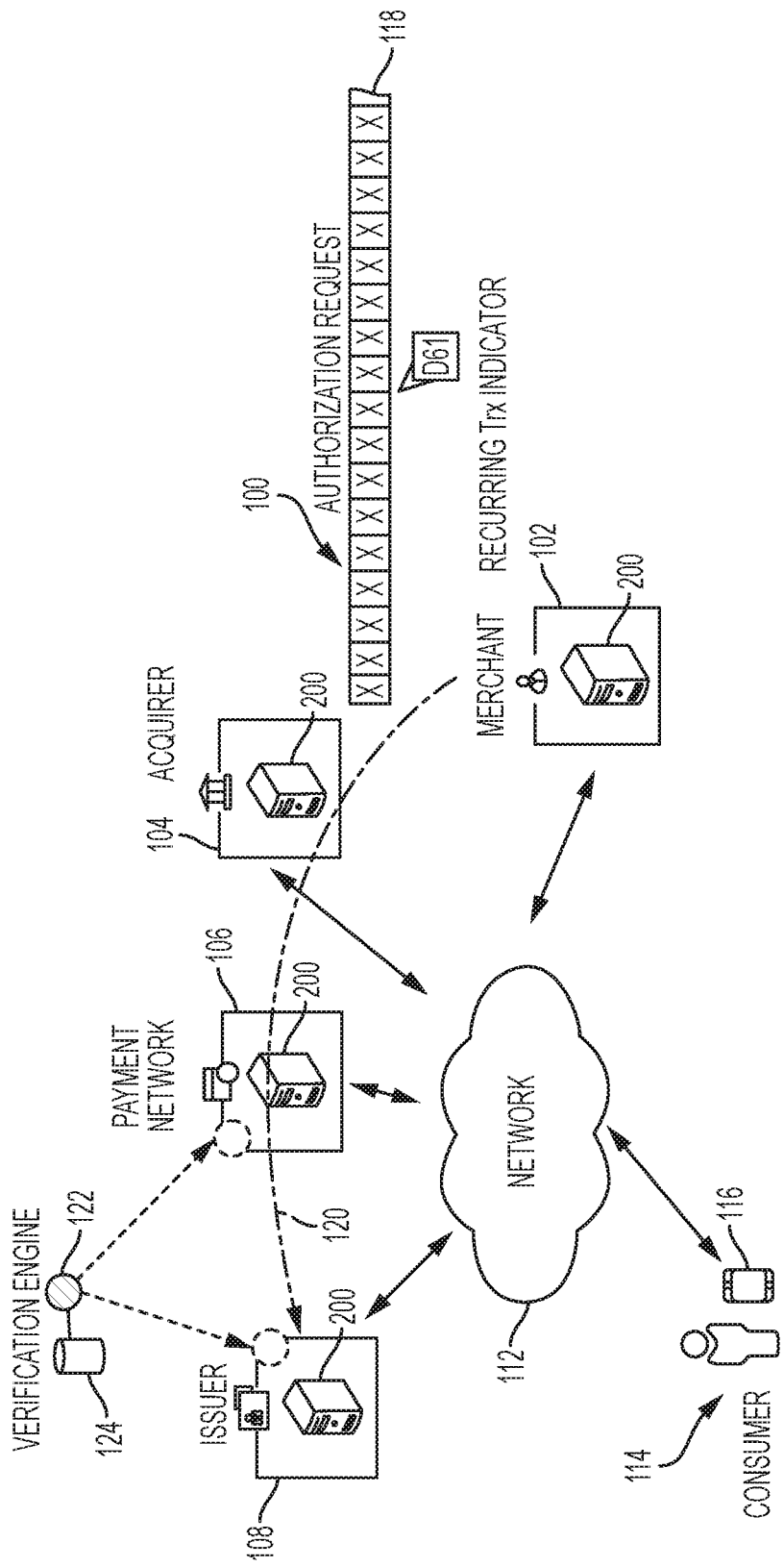
FIG. 1 is a block diagram of an exemplary system of the present disclosure suitable for use in verifying recurring transactions, from a merchant, to a payment account associated with a consumer.
Figure 3:
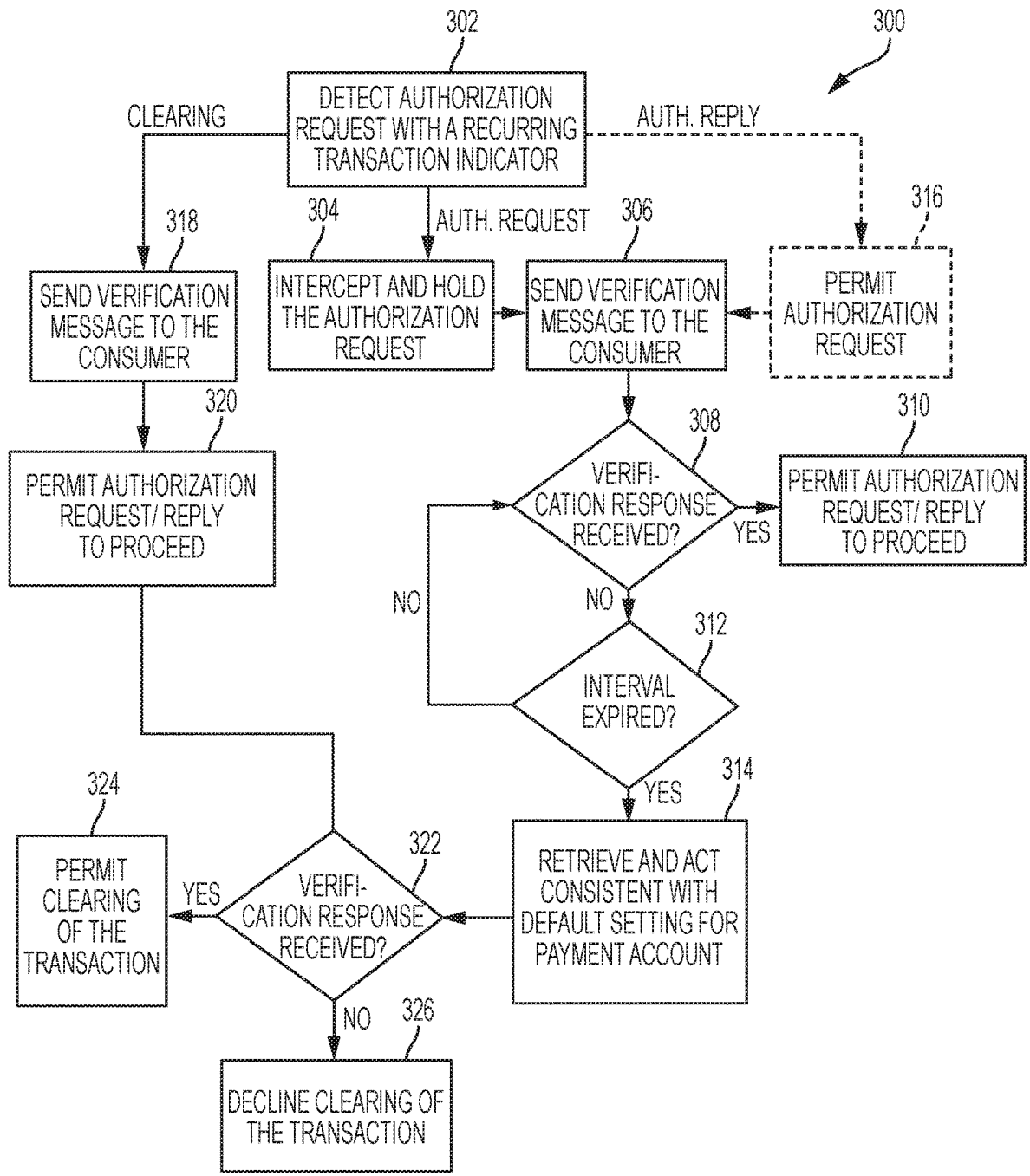
FIG. 3 is an exemplary method for verifying a recurring transaction by a merchant to a payment account associated with a consumer, that may be implemented in the system of FIG. 1.
Figure 4:
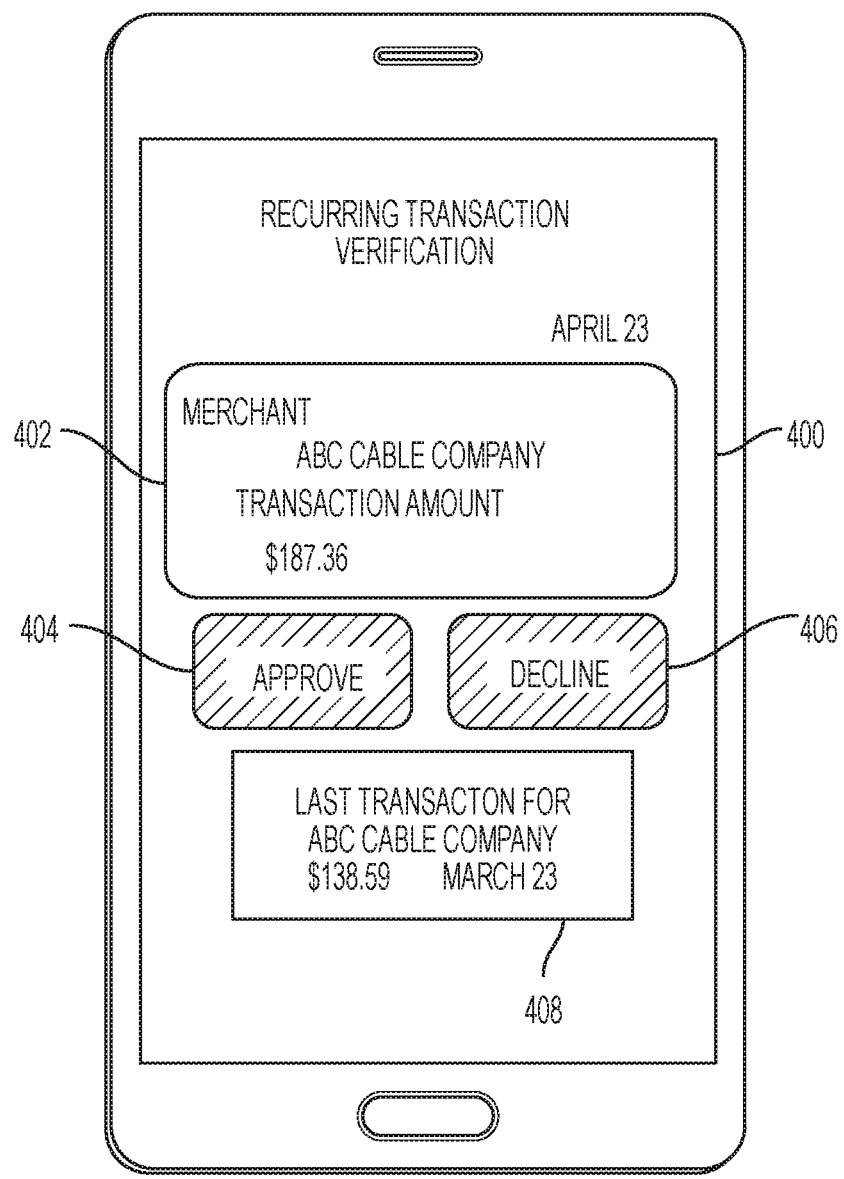
Figure 5:
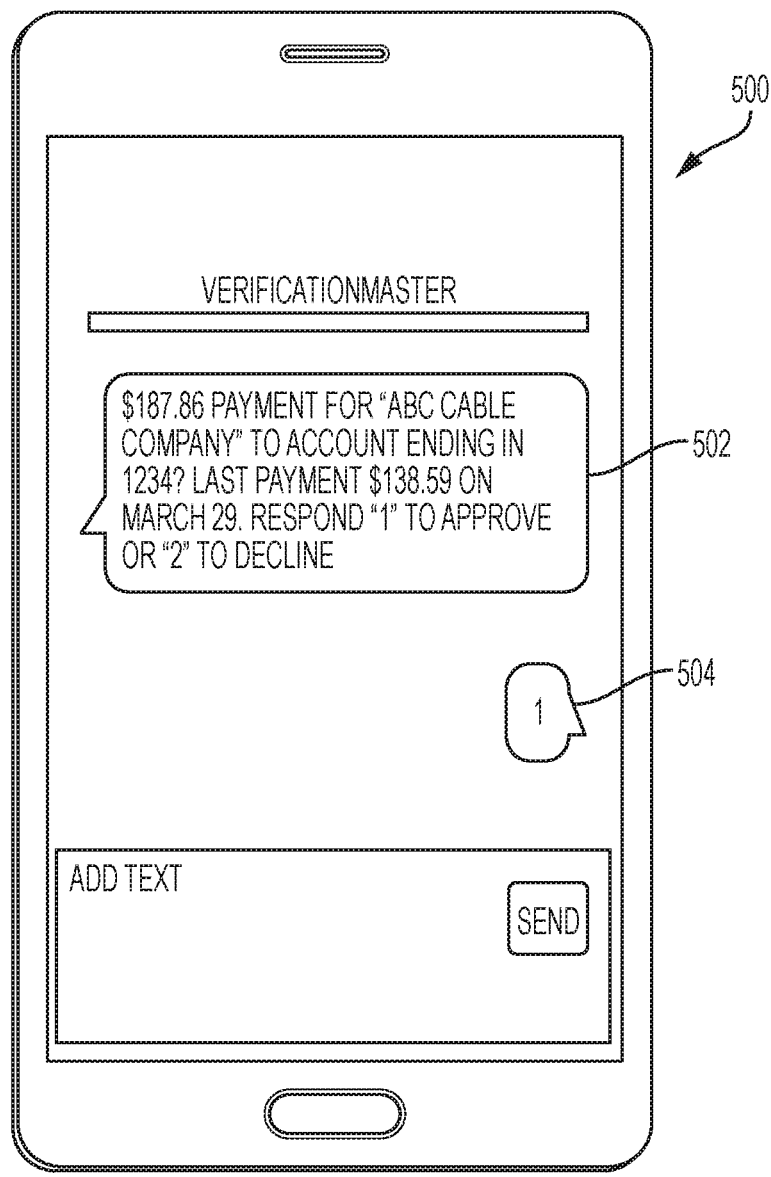

FIG. 4 is an exemplary interface, which may be displayed to a consumer in connection with the system of FIG. 1 and/or the method of FIG. 3, for use in verifying a recurring transaction to a payment account associated with the consumer; and FIG. 5 is another exemplary interface, which may be displayed to a consumer in connection with the system of FIG. 1 and/or the method of FIG. 3, for use in verifying a recurring transaction to a payment account associated with the consumer.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

For a variety of regularly delivered products (e.g., goods and/or services, etc.), or other products, merchants attempt to arrange automatic payments with consumers for the products, whereby the merchants schedule regular, automatic transactions to payment accounts associated with the consumers in exchange for the products. In this manner, the merchants submit the transactions to the consumers' payment accounts, and often are able to receive on-time payments therefrom, generally without the consumers contemporaneously participating in the transactions (e.g., without the consumers initiating and/or further approving the transactions, etc.). Such "auto-pay" options for the merchants may be directed to a variety of different payment accounts and are known for a variety of products (e.g., utilities, loans, insurance, membership dues, in home services, etc.). Uniquely, the systems and methods herein enable the consumers to verify the recurring transactions, prior to the recurring transactions being authorized and/or cleared. In particular, upon transmission of authorization requests from merchants for recurring payments, payment networks and/or issuers associated with payment accounts to which the recurring payments are directed may hold the authorization requests while verification messages are transmitted to the consumers. The payment networks and/or the issuers may continue to hold the authorization requests, or may proceed with authorization of the transactions in certain instances, yet decline clearing the transactions, unless responses to the verification messages are received from the consumers (and/or particular criteria are satisfied according to one or more preferences). In this manner, while the merchants are able to setup recurring transactions to the payment accounts, the consumers associated with those payment accounts are provided the ability to approve/decline each such one of the recurring transactions.

FIG. 1 illustrates an exemplary system 100, in which the one or more aspects of the present disclosure may be implemented. Although the system 100 is presented in one arrangement, other embodiments may include systems arranged otherwise depending, for example, on the manner of processing recurring transactions to payment accounts, etc.

The system 100 generally includes a merchant 102, an acquirer 104, a payment network 106, and an issuer 108, each coupled to (and in communication with) network 112. The network 112 may include, without limitation, a local area network (LAN), a wide area network (WAN) (e.g., the Internet, etc.), a mobile network, a virtual network, and/or another suitable public and/or private network capable of supporting communication among two or more of the parts illustrated in FIG. 1, or any combination thereof. For example, network 112 may include multiple different networks, such as a private payment transaction network made accessible by the payment network 106 to the acquirer 104 and the issuer 108 and, separately, the public Internet, which is accessible as desired to the merchant 102, the acquirer 104, the payment network 106, the issuer 108, and consumer 114.

The merchant 102 is generally associated with products (e.g., goods and/or services, etc.) for purchase by one or more consumers. In addition, the merchant 102 offers its consumers recurring transactions, as an option for payment for the products, whereby the consumers (e.g., consumer 114, etc.) provide certain payment account information and the merchant 102 (without further authorization from the consumers) charges the consumers' payment accounts at one or more regular or irregular intervals (including standing orders) (i.e., as recurring transactions) for products received by the consumers. The products may include, for example, utility services (e.g., water, gas, power, etc.), telecommunication or cable services, loan services, periodicals, subscriptions, insurance services, in-home services (whether residential or commercial), and/or any other products. Further, while only one merchant 102 is shown in FIG. 1, it should be understood that other embodiments may include multiple merchants, and/or may include one or more different types of merchants offering a variety of different products, which may, for example, be purchased at regular or irregular intervals. But, merchants, as used herein, generally permit recurring transactions, as an option for payment for products.

With continued reference to FIG. 1, the consumer 114 is associated with a payment account (or with multiple payment accounts) through which the consumer 114 funds transactions for products.

In connection with a transaction between the consumer 114 and the merchant 102, upon receiving payment information from the consumer 114 for a selected product(s) (e.g., at auto-pay registration, or otherwise, etc.), the merchant 102 determines a payment transaction schedule for the consumer 114, and for the product(s) received by the consumer 114. The schedule, in general, defines the recurring transactions to the payment account associated with the consumer 114, which may be at a regular or irregular interval (e.g., monthly, bi-monthly, upon product delivery, etc.). When the transaction is due, the merchant 102 submits an authorization request (e.g., authorization request 118 in FIG. 1, etc.) to the acquirer 104 for each recurring transaction on the schedule. The path of the authorization request is indicated by the dotted line in FIG. 1, which is referenced 120, and described in detail below. Further, as shown in FIG. 1, the authorization request includes a recurring transaction indicator, which may, for example, specifically include an indicator within an ISO 8583 message (e.g., '4' at D61SF4 of a 0100 message according to the ISO 8583 format (meaning "standing order/recurring payment"), etc.), or which may be included in other messages and/or formats of messages, etc. The authorization request further includes the payment account number, the amount of the transaction, a merchant ID, and/or additional information as indicated in conventional authorization requests and/or as necessary to process recurring payments, etc.

The acquirer 104, in turn, as further indicated by path 120, conventionally communicates the authorization request to the issuer 108, through the payment network 106, such as, for example, through MasterCard®, VISA®, Discover®, American Express®, etc., to determine (in conjunction with the issuer 108 that provided the payment account to the consumer 114) whether the payment account is in good standing and whether there is sufficient credit or funds to complete the transaction. If the issuer 108 accepts the transaction, a reply authorizing the transaction is conventionally provided back to the acquirer 104 and the merchant 102, thereby permitting the merchant 102 to complete the transaction. The transaction is later cleared and/or settled by and between the merchant 102 and the acquirer 104 (via an agreement between the merchant 102 and the acquirer 104), and by and between the acquirer 104 and the issuer 108 (via an agreement between the acquirer 104 and the issuer 108) (through further communication therebetween). If the issuer 108 declines the transaction, a reply declining the transaction is provided back to the merchant 102, thereby permitting the merchant 102 to stop the transaction.

The above transaction is described with reference to a credit account. However, it should be appreciated that purchase transactions may further include other transactions, such as debit transactions and pre-paid transactions. For debit and pre-paid accounts, a transaction, and processing thereof, is substantially similar to the above transaction, but may further include the use of a personal identification number (PIN) authorization and/or more rapid posting of the charge to the payment account, etc.

Transaction data is generated, collected, and stored as part of the above interactions among the merchant 102, the acquirer 104, the payment network 106, the issuer 108, and the consumer 114. The transaction data represents at least a plurality of transactions, for example, authorized transactions, cleared transactions, attempted transactions, etc. The transaction data, in this exemplary embodiment, is stored at least by the payment network 106 (e.g., in a data structure associated with the payment network 106, etc.). Additionally, or alternatively, the merchant 102, the acquirer 104 and/or the issuer 108 may store the transaction data, or part thereof, in a data structure, or transaction data may be transmitted between parts of system 100, as used or needed (e.g., for clearing, etc.). The transaction data may include, for example, payment account numbers, amounts of the transactions, merchant IDs, merchant category codes (MCCs), dates/times of the transactions, products purchased and related descriptions or identifiers, etc. It should be appreciated that more or less information related to transactions, as part of either authorization, clearing, and/or settling, may be included in transaction data and stored within the system 100, at the merchant 102, the acquirer 104, the payment network 106, and/or the issuer 108.

In various exemplary embodiments, the consumers (e.g., consumer 114, etc.) involved in the different transactions herein are prompted to agree to legal terms associated with their payment accounts, for example, during enrollment in their accounts, etc. In so doing, the consumers may voluntarily agree, for example, to allow merchants, issuers, payment networks, etc., to use data collected during enrollment and/or collected in connection with processing the transactions, subsequently for one or more of the different purposes described herein.

While one merchant 102, one acquirer 104, one payment network 106, one issuer 108, and one consumer 114 are illustrated in FIG. 1, it should be appreciated that any number of these entities (and their associated components) may be included in the system 100, or may be included as a part of systems in other embodiments, consistent with the present disclosure.

Figure 2:
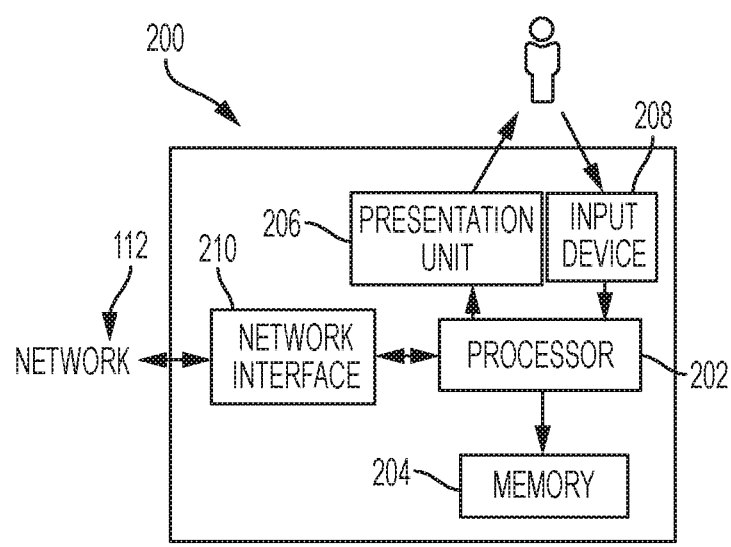
FIG. 2 is a block diagram of a computing device that may be used in the exemplary system of FIG. 1.

FIG. 2 illustrates an exemplary computing device 200 that can be used in the system 100. The computing device 200 may include, for example, one or more servers, workstations, personal computers, laptops, tablets, smartphones, PDAs, etc. In addition, the computing device 200 may include a single computing device, or it may include multiple computing devices located in close proximity or distributed over a geographic region, so long as the computing devices are specifically configured to function as described herein. However, the system 100 should not be considered to be limited to the computing device 200, as described below, as different computing devices and/or arrangements of computing devices may be used. In addition, different components and/or arrangements of components may be used in other computing devices.

In the exemplary embodiment of FIG. 1, each of the merchant 102, the acquirer 104, the payment network 106, and the issuer 108 are illustrated as including, or being implemented in, computing device 200, coupled to the network 112. Further, the computing devices 200 associated with these entities, for example, may include a single computing device, or multiple computing devices located in close proximity or distributed over a geographic region, again so long as the computing devices are specifically configured to function as described herein. In addition, portable communication device 116, which is associated with consumer 114, can also be considered a computing device consistent with computing device 200 for purposes of the description herein.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic circuit (PLC), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, transaction data (e.g., authorization data, clearing data, etc.), preferences, settings (e.g., default settings, etc.), payment account information, recurring payment conditions and/or schedules, and/or other types of data (and/or data structures) suitable for use as described herein.

Furthermore, in various embodiments, computer-executable instructions may be stored in the memory 204 for execution by the processor 202 to cause the processor 202 to perform one or more of the functions described herein, such that the memory 204 is a physical, tangible, and non-transitory computer readable storage media. Such instructions often improve the efficiencies and/or performance of the processor 202 that is performing one or more of the various operations herein. It should be appreciated that the memory 204 may include a variety of different memories, each implemented in one or more of the functions or processes described herein.

In the exemplary embodiment, the computing device 200 includes a presentation unit 206 that is coupled to (and in communication with) the processor 202 (however, it should be appreciated that the computing device 200 could include output devices other than the presentation unit 206, etc.). The presentation unit 206 outputs information (e.g., verification options, etc.), either visually or audibly to a user of the computing device 200, for example, the consumer 114 in the system 100, etc. Various interfaces (e.g., as defined by web-based applications, webpages, short message service (SMS) messages, emails, etc.) may be displayed at computing device 200, and in particular at presentation unit 206, to display such information. The presentation unit 206 may include, without limitation, a liquid crystal display (LCD), a light-emitting diode (LED) display, an organic LED (OLED) display, an "electronic ink" display, speakers, etc. In some embodiments, presentation unit 206 includes multiple devices.

The computing device 200 also includes an input device 208 that receives inputs from the user (i.e., user inputs) such as, for example, selections of verification options, etc. The input device 208 is coupled to (and in communication with) the processor 202 and may include, for example, a keyboard, a pointing device, a mouse, a stylus, a touch sensitive panel (e.g., a touch pad or a touch screen, etc.), another computing device, and/or an audio input device. Further, in various exemplary embodiments, a touch screen, such as that included in a tablet, a smartphone, or similar device, behaves as both a presentation unit and an input device.

In addition, the illustrated computing device 200 also includes a network interface 210 coupled to (and in communication with) the processor 202 and the memory 204. The network interface 210 may include, without limitation, a wired network adapter, a wireless network adapter, a mobile network adapter, or other device capable of communicating to/with one or more different networks, including the network 112. Further, in some exemplary embodiments, the computing device 200 includes the processor 202 and one or more network interfaces incorporated into or with the processor 202.

Referring again to FIG. 1, the system 100 includes a verification engine 122, which is specifically configured, by executable instructions, to perform one or more of the operations herein. As shown in FIG. 1, the verification engine 122 is illustrated apart from the payment network 106 and the issuer 108, but, as indicated by the dotted lines, may be incorporated with either. In other embodiments, however, it should be appreciated that the verification engine 122 may be incorporated with other parts of the system 100 (e.g., the acquirer 104, etc.). In general, the verification engine 122 may be implemented and/or located, based on where, in path 120, for example, the verification messages are transmitted to the consumer 114 and/or how authorization and/or clearing of the recurring transaction is affected by the operations described herein, etc.

Further, it should be appreciated that the verification engine 122 may be implemented in the system 100 in a computing device consistent with computing device 200, or in other computing devices within the scope of the present disclosure.

In various embodiments, the consumer 114 is registered to the verification engine 122 (e.g., when signing up for an auto-payment service provided by one or more parts of the system 100, when initially purchasing a product from the merchant 102, at other times, etc.). The verification engine 122 is further associated with at least one data structure (e.g., data structure 124, etc.), in which registration and/or account information for the consumer 114 and multiple additional consumers are stored. In particular embodiments, at registration, the consumer 114 may install an application (i.e., as defined by executable instructions) at the portable communication device 116 associated with the consumer 114, to which a contact credential (e.g., a unique application identifier, etc.) is stored in the data structure 124. Alternatively, rather than a stand-alone application, the operations described herein for the portable communication device 116 may be incorporated in one or more other applications (e.g., e-wallet applications, etc.) with the verification engine 122 recognizing, and storing in data structure 124, a contact credential for the consumer 114. In still another embodiment, the verification engine 122 may contact the consumer 114 in other manners, such as, for example, an SMS message, email, etc., whereby contact credentials stored in the data structure 124 includes phone numbers, email addresses, etc. In this manner, the verification engine 122 is structured to retrieve the particular contact credential pointing to the consumer's portable communication device 116 and then to transmit one or more messages (e.g., verification requests, etc.) to the portable communication device 116. In turn, the portable communication device 116 is configured to receive the messages from the verification engine 122 and respond accordingly (e.g., display the verification request, display a verification interface to the consumer 114, etc.).

It should be appreciated that various suitable contact credentials, such as, for example, account identifiers, phone numbers, email addresses, etc., may be stored in the data structure 124 and associated with the consumer 114, the consumer's portable communication device 116, and/or the consumer's payment account, whereby the verification engine 122 is able to transmit messages to the consumer 114. Further, it should be appreciated that any different communication device (i.e., portable or otherwise) may be associated with the consumer 114, in other embodiments, to provide the same or a different medium of communication with the consumer 114 (which is known to the verification engine 122).

In addition to providing a contact credential for the portable communication device 116, the consumer 114 further, as part of the registration to the verification engine 122, may provide one or more user preferences to the verification engine 122, which are stored in data structure 124. The preferences may include, for example, default settings, which instruct the verification engine 122 how to proceed in the absence of a verification response from the consumer 114 after one or more intervals (e.g., after about one hour, about two hours, about six hours, other intervals, etc.) following one or more authorization requests, clearing directions, and/or verification requests, as provided below. Also, a consumer's preference of contact credentials may further be included in the data structure 124 to inform the verification engine 122 of the consumer's preferred medium of receiving verification messages, etc.

Further still, the data structure 124 may include preferences associated with the payment network 106 and/or issuer 108, including, for example, conditions on holding (or not holding) an authorization and/or a clearing of a transaction. For example, the issuer 108 may include a transaction amount and/or merchant qualifier, as a condition for the transaction to be verified as described herein. Further, in a variety of embodiments, the data structure 124 includes a listing of payment account number (PANs), for which transactions are to be verified. For example, certain consumers may opt to participate in verification of recurring payments, while others may not. A listing of PANs associated with a verification service therefore permits the verification engine 122 to distinguish between a payment account opting for the verification, and one that is not.

In general, in the system 100, the verification engine 122 is configured to detect and/or receive certain authorization requests, which involve recurring transactions submitted by merchant 102 (and/or by other merchants supported by the system 100) (for a payment account opting to verify recurring transactions). Upon detection, the verification engine 122 is configured to retrieve the contact credential associated with the payment account (from the data structure 124) and to transmit a verification message to the consumer 114, at the portable communication device 116. In doing so, the verification engine 122 is configured to cause a verification request (e.g., one or more verification interfaces, SMS messages, emails, etc.) to be displayed at the consumer's portable communication device 116, by which the consumer 114 may approve or decline the recurring transaction associated with the authorization request. In the meantime, the verification engine 122 may be configured to act to hold and/or inhibit certain aspects of the recurring transaction such as, for example, authorization, clearing, etc. In one example, the verification engine 122 is configured to hold the authorization request (or corresponding authorization reply) until a verification response is recognized (e.g., received from the consumer 114, etc.). In other examples, the verification engine 122 is configured to permit authorization of the recurring transaction, yet inhibit clearing of the transaction until the verification response is recognized. Upon recognizing the verification response from the consumer 114, in these examples, the verification engine 122 is configured to permit the recurring payment to proceed. Otherwise, the verification engine 122 is configured to cause the recurring transaction to be declined, or otherwise impacted as prescribed by one or more of the consumer's preferences (or other preferences).

FIG. 3 illustrates an exemplary method 300 for verifying a recurring transaction to a payment account, prior to permitting the transaction to be cleared (or, in some aspects, even authorized). The exemplary method 300 is described as implemented in the verification engine 122 and the portable communication device 116 associated with consumer 114. However, it should be understood that the method 300 is not limited to this configuration of the verification engine 122 or the portable communication device 116, as the method 300 may be implemented in other ones of the computing devices 200 in system 100, or in multiple other computing devices. As such, the methods herein should not be understood to be limited to the exemplary system 100 or the exemplary computing device 200, and likewise, the systems and the computing devices herein should not be understood to be limited to the exemplary method 300.

The merchant 102 provides various products to consumers in the system 100, including consumer 102. Many of the merchant's products are purchased by the consumers repeatedly over time (e.g., on a recurring schedule, etc.) or are purchased at one time with payments then being repeated over time. To make such repeat transactions more convenient, the merchant 102 often receives payment account information from the consumers for an initial purchase (or at an auto-pay registration with the merchant 102 or with another entity, etc.), and then, with permission from the consumers, uses the same payment account information for subsequent transactions for the repeat products, or for the repeat payments. Generally, upon receiving the payment account information from the consumers, the merchant 102 determines a payment transaction schedule for the repeat products and/or repeat payments that generally defines the times (e.g., dates, etc.) when transactions to the consumers' payment accounts will be processed (or initiated).

In connection with such a payment transaction schedule for consumer 114, when a defined time arrives for one of the scheduled transactions, the merchant 102 submits an authorization request to the acquirer 104 for the scheduled transaction. In turn, and as described above in the system 100, the acquirer 104 then communicates the authorization request to the issuer 108 via the payment network 106, for processing (e.g., authorization, clearing, settlement, etc.). As the authorization request involves the scheduled (or recurring) transaction, the merchant 102 also includes a recurring transaction indicator in the authorization request (e.g., at D61 of an 0100 message according to the ISO 8583 format, etc.), along with the consumer's payment account number, the amount of the scheduled transaction, the merchant's ID, and any additional information needed for processing the particular scheduled recurring transaction.

In turn in the method 300, the verification engine 122 detects the authorization request generated by the merchant 102, at 302, based on the recurring transaction indicator included therein. As described above, in the system 100, the verification engine 122 is a standalone entity. As such, the verification engine 122 may detect the authorization request generally at any location along path 120 between the merchant 102 and the issuer 108. For example, the verification engine 122 may detect the authorization request, as being a recurring transaction, at the payment network 106 or at the issuer 108. In some embodiments, the verification engine 122 may review all or substantially all authorization requests, in general or associated with particular payment accounts (or particular merchants (e.g., merchant 102), etc.), received from the acquirer 104, and upon detecting the recurring payment indicator, identify the transaction as a recurring transaction. In particular, the recurring transaction indicator may be included as a particular numeric and/or alphanumeric digit (or combination of numeric and/or alphanumeric digits), including, for example, a "4" at D61SF4 of a 0100 message according to the ISO 8583 format (indicating "standing order/recurring payment"), from which the verification engine 122 is able to detect the authorization request as being for a recurring transaction.

Alternatively, in other embodiments, the verification engine 122 may receive authorization requests for only recurring transactions upon which to act as described herein. In such other embodiments, the payment network 106 and/or the issuer 108 may separately detect whether or not an authorization request is associated with a recurring transaction, with only authorization requests for recurring transactions then being forwarded, passed and/or transmitted to the verification engine 122 (at which point, broadly, the verification engine 122 then detects the authorization requests).

Next, upon detecting that the authorization request from the merchant 102 includes the recurring transaction indicator, the verification engine 122 intercepts the authorization request, at 304, and holds it in the data structure 124, for example. In one particular example, the verification engine 122 may employ the data structure 124 as a queue of authorization requests (for multiple recurring transactions) being held by the verification engine 122 (and waiting to proceed as described below). In so doing, the verification engine 122 effectively inhibits the authorization request from being further processed by the payment network 106 (e.g., from being transmitted to the issuer 108, etc.) and/or the issuer 108 (e.g., from being authorized or denied, etc.), depending on where the verification engine 122 intercepts the authorization request. In connection with this operation, an authorization reply to the authorization request may not be returned by the issuer 108 to the merchant 102, until the verification engine 122 releases the authorization request (i.e., upon recognizing a verification response, for example). In some embodiments, the verification engine 122 may intercept and hold the authorization reply, at 304.

While holding the authorization request, the verification engine 122 transmits a verification message to the consumer 114, at 306. In particular in this embodiment, the verification engine 122 transmits the verification message to the consumer's portable communication device 116, via network 112. The verification message may include any suitable message, and may be transmitted to the consumer 114 via any suitable medium (e.g., as an email, as a SMS text message, etc.). In addition, the verification message may include content upon which an interface may be compiled at the portable communication device 116 (by a companion web-based application, as described above), and/or may include a link to an interface, which upon selection, may then be displayed at the consumer's portable communication device 116. In general, by sending the verification message, the verification engine 122 causes an interface to be displayed to the consumer 114, whether in a form specific to an application configured for use with the verification engine 122, or through a conventional medium (e.g., email, SMS message, etc.), at the portable communication device 116, which permits the consumer 114 to approve (or verify) or decline the specific recurring transaction.

FIG. 4 illustrates an exemplary verification interface 400, which may be displayed at the consumer's portable communication device 116 (as defined by instructions therein) based on the verification message received from the verification engine 122. As shown in FIG. 4, the illustrated verification interface 400 includes a section 402 that indicates the scheduled recurring transaction to be reviewed by the consumer 114, including a name of the merchant 102 (i.e., "ABC Cable Company") and an amount of the scheduled transaction (i.e., $187.36). The interface 400 further includes buttons 404 and 406. The buttons 404 and 406 are provided for the consumer 114 to respond to the verification engine 122, which, in this embodiment, includes either approving the scheduled recurring transaction (via button 404) or declining the scheduled recurring transaction (via button 406). That is, the portable communication device 116 is configured to transmit the verification response to the verification engine 122, based on which of the buttons 404 or 406 is selected by the consumer 114 (i.e., based on a consumer input to the interface 400, etc.). In other exemplary interfaces, the consumer 114 may be permitted to take other actions, including for example, approving a specific transaction amount, contacting customer service for the merchant 102, etc.

The illustrated verification interface 400 also includes a section 408, in which details of a last (or prior) scheduled transaction processed to the consumer's payment account are provided (e.g., in accordance with the payment transaction schedule for the consumer 114 created by the merchant 102, etc.). In this example, the proposed recurring transaction includes an increase of $48.77 (i.e., $187.36-$138.59), which the consumer 114 may deem relevant to either approving or declining the current recurring transaction. In this manner, the consumer 114 is able to be informed of the different amount of the current recurring transaction being sought by the merchant 102, rather than after the fact, which may be of particular interest to the consumer 114 when the merchant 102 has the ability to alter the recurring payment amount (with or without prior notice).

FIG. 5 illustrates another exemplary verification interface 500, displayed at the communication device 116, consistent with a conventional SMS message format. As shown, the verification message 502, from the verification engine 122, relies on a conventional SMS messaging format as a medium of communication, yet relays the same data about the recurring transaction (e.g., a name of the merchant 102 an amount of the scheduled transaction (i.e., $187.36), etc.), as is provided in the interface 400 of FIG. 4. Like the interface 400, the verification message of FIG. 5 instructs the consumer 114 how to respond to verify, i.e., reply with "1" to approve and reply with "2" to decline. In the verification interface 500 shown in FIG. 5, the consumer 114 responded with a reply text message, at 504, indicating "1" to approve the recurring transaction.

It should be appreciated that other interfaces and/or verification message are contemplated. In other embodiments, for example, verification interfaces may include additional and/or different fields and/or formats providing additional and/or different data to the consumer 114 for review/consideration when deciding to approve or decline a scheduled recurring transaction, such as an indication of an interval by which a response is required to avoid a default action (e.g., an automatic approval, etc.). In particular, the verification message (or interface at communication device 116, for example) may include a recurring transaction number (e.g., a "billing even number," etc.) and a support contact (e.g., phone number, messenger, chat feature, etc.). In such examples, the consumer 114 is able to contact the verification engine 122, the merchant 102, or other entity to inquire about the recurring transaction, often by use of the recurring transaction number or one or more details of the consumer (e.g., payment account number, name, address, birthday, etc.), etc. In addition, it should be appreciated that the fields and/or arrangements of the fields, regardless of whether additional information is included, may be different than illustrated in the exemplary interface 400 of FIG. 4, or the exemplary interface of FIG. 5.

It should further be appreciated that the verification message, from the verification engine 122, may cause one or more different alerts to the consumer 114. For example, a verification message may cause a "ding," tone, or other alert to be provided, at presentation unit 206, of the communication device 116. In this manner, especially for interval-dependent verifications, the consumer 114 is notified of the receipt of the verification message, to which a response is needed.

With reference again to FIG. 3, at 308, the verification engine 122 determines whether it has received a verification response from the consumer 114 approving the recurring transaction. For example, the consumer 114, in interface 400, simply selects the "approve" button 404 or the "decline" button 406, or in interface 500, sends a reply text message indicating "1" or "2," in either instance (i.e., at 504), thereby transmitting a response to the verification engine 122. In turn, when a verification response indicates approval, the verification engine 122 permits the authorization request (or authorization reply, depending on which is being held) to proceed, at 310. Then, as previously described in the system 100, if the issuer 108 approves the transaction (when the authorization request is being held), a reply authorizing the transaction is provided from the issuer 108, via the payment network 106, back to the acquirer 104 and the merchant 102, thereby permitting the merchant 102 to complete the transaction. The transaction is later cleared and/or settled by and between the merchant 102 and the acquirer 104, and by and between the acquirer 104 and the issuer 108. If the issuer 108 declines the transaction, a reply declining the transaction is provided back to the merchant 102, thereby permitting the merchant 102 to terminate the transaction.

Conversely, when the verification engine 122 receives, at 308, a verification response from the consumer 114 declining the scheduled transaction, the verification engine 122 terminates the authorization request. More specifically, the verification engine 122 generates and transmits a decline for the recurring transaction to the merchant 102 (i.e., the authorization request is not received and/or responded to by the issuer 108). In at least one embodiment, the authorization reply, generated by the verification engine 122, includes at least one numeric and/or alphanumeric indicator to inform the merchant 102 that the transaction was decline by consumer action. The indicator may be included, for example, at DE60 of the 0110 message from the verification engine 122, according to the ISO 8583 format, or in other messages and/or formats. In other embodiments, the reason for the declined transaction may be omitted from any authorization reply or response.

Further, when the verification engine 122 sends the verification message, the verification engine 122 further initiates a countdown of a predefined interval (e.g., about one hour, about two hours, about eight hours, etc.), for receipt of a verification response. The predefined interval may be set by the consumer 114, or the verification engine 122 (or another entity), and potentially depending on, for example, the presumed interval for a response (given a medium of communication, a preference, one or more constraints associated with the payment network 106, etc.). At 312, the verification engine 122 determines if the predefined interval is expired, or not. When not expired, the verification engine 122 returns to 308, to wait for the verification response. If, however, the verification determines the predefined interval is expired, at 312, the verification engine 122 retrieves (from the data structure 124), and acts consistent with, one or more preferences and/or settings (i.e., default setting in this embodiment, etc.) associated with the payment account, at 314.

For example, a default setting or preference (in the data structure 124) for the consumer 114 may instruct the verification engine 122 to approve the recurring transaction, after the predefined interval without a verification response. Or, the default setting or preference may instruct the verification engine 122 to decline the recurring transaction if the predefined interval expires prior to receipt of the verification message. Or further still, based on one or more preferences or settings, the verification engine 122 may permit the authorization request to proceed, when no verification response is received during the predefined interval. The verification engine may then cause the method 300 to proceed to operations described below, at 322, for example, which may subject the verification message to a second predefined interval to receive a verification response before clearing the recurring transaction. Additionally, or alternatively, in at least one example, the consumer preference may opt for verification of recurring payments, only when the amount of the transaction has changed since a last or prior recurring transaction to the merchant (e.g., a bill amount for cable services changes (e.g., increase $35, etc.), etc.), or is above a predefined amount (e.g., for recurring transactions with amounts above $20.00, etc.).

It should be appreciated that a variety of preferences and/or settings may implicate when and how actions should be taken in response to the absence of a verification response. The preferences and/or settings, again, may potentially be dictated by the consumer 114, the issuer 108 and/or another entity associated with the particular recurring transaction.

Optionally in the method 300 (as indicated by the dotted lines in FIG. 3), the verification engine 122 may permit, at 316, the authorization request to be processed by the issuer 108 and then wait to transmit a verification message to the consumer until a reply to the authorization request is generated. More specifically, similar to an AFD (automated fuel dispenser) transaction, the verification engine 122 may transmit an authorization message merely to confirm the consumer's payment account is in good standing with the issuer 108, and/or to make a determination that sufficient funds are available in the consumer's payment account to cover the transaction, etc. Then, if the issuer 108 responds in the affirmative, the verification engine 122 may transmit the verification message to the consumer 114, at 306 (and proceed as described above). When, or if, the verification response is received (with an approval), the verification engine 122 then sends a complete authorization request to the issuer 108. If, however, the reply indicates a declined transaction, the verification engine 122 may simply permit (or release, as necessary) the authorization reply to be delivered to the acquirer 104 and merchant 102. As such, when this optional operation 314 is included or performed by the verification engine 122, the verification engine 122 avoids sending an unnecessary verification message to the consumer 114 when the issuer 108 would ultimately have declined the transaction with or without verification from the consumer 114.

With continued reference to FIG. 3, alternatively (or additionally) in the method 300, upon detecting and/or receiving the authorization request for a recurring transaction, at 302, the verification engine 122 may transmit a verification message to the consumer 114, at 318, in connection with clearing the recurring transaction (e.g., after the authorization request proceeds and is approved, etc.). In particular in this embodiment, the verification engine 122 transmits the verification message to the consumer's portable communication device 116 via network 112. This is generally done in similar fashion to transmitting the verification message as described with reference to 306.

At about the same time the verification engine 122 transmits the verification message to the consumer 114 (or earlier or later), the verification engine 122 also permits the authorization request (or reply) to proceed, at 320. In connection therewith, and as previously described in the system 100, if the issuer 108 declines the transaction, a reply declining the transaction is provided back to the acquirer 104 and the merchant 102, thereby permitting the merchant 102 to stop the transaction (potentially without sending the verification message at 318). Alternatively, if the issuer 108 approves the transaction, a reply approving the transaction is provided back to the merchant 102, thereby permitting the merchant 102 to proceed with the recurring transaction. Verification of the transaction by the consumer 114 is then required before the transaction can be cleared by and between the merchant 102 and the acquirer 104, and by and between the acquirer 104 and the issuer 108.

When the verification engine 122 receives, at 322, a verification response from the consumer 114 approving the scheduled transaction, the verification engine 122 permits clearing of the recurring transaction to proceed, at 324. Such clearing generally proceeds according to conventional operations by and between the merchant 102 and the acquirer 104, and by and between the acquirer 104 and the issuer 108.

However, when the verification engine 122 does not receive a verification response from the consumer 114, at 320, the verification engine 122 declines clearing of the recurring transaction, at 326. For example, the verification engine 122 may generate and send one or more messages to the issuer 108 and/or acquirer 104 to reverse and/or undue the transaction (either by specific reversal of the recurring transaction, or by a credit and/or return transaction of the recurring transaction amount, etc.) to the consumer's payment account, whereby the recurring transaction is essentially nullified in the associated clearing records. In particular, the verification engine 122 may generate and send a message to the issuer 108, which would reverse the particular recurring transaction. The acquirer 104 may then discover the reversal in the clearing process, and debit the appropriate amount from the merchant's account.

In view of the above, the systems and methods herein may permit consumers to be involved in approving and/or declining scheduled recurring transactions to the consumers' payment accounts (e.g., after initial setup), thereby altering conventional authorization and/or clearing of recurring transactions. As such, the consumers and/or the merchants involved can reap the benefits of auto-pay type options, while still preserving further verification of the consumers' permissions to make such transactions. In this manner, the consumers are able to decline recurring transactions that reflect transactions and/or transaction amounts different than previously agreed to, and/or that are otherwise inconsistent with the consumers' intentions for the recurring transactions to the payment accounts.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving an authorization request for a transaction to a payment account and involving a merchant, the authorization request including a recurring payment indicator; (b) transmitting a verification request to a consumer associated with the payment account; (c) inhibiting at least clearing of the transaction until a verification of the transaction, based on a direction from the consumer, is recognized, whereby the consumer is able to verify the transaction before the transaction is cleared; (d) transmitting an authorization reply to the merchant including an approval of the transaction; (e) transmitting a decline authorization reply, to the merchant, when the verification of the transaction is not recognized within a predefined interval; (f) recognizing the verification of the transaction when a predefined interval expires for responding to the verification message; (g) causing the authorization reply to include an indicator of a consumer-declined transaction; and (h) detecting the recurring payment indictor in the authorization request for the recurring transaction; and identifying the transaction as a recurring transaction.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" includes any and all combinations of one or more of the associated listed items.

In addition, as used herein, the term product may include a good and/or a service.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in processing a recurring transaction, the method comprising:
    detecting, by at least one computing device of a payment network, an authorization request for a recurring transaction to a payment account, directed from a merchant, via an acquirer, to an issuer of the payment account, the authorization request including a payment account number indicative of the payment account and a recurring payment indicator, and the recurring transaction submitted by the merchant based on a prior permission of a consumer; and
    in response to detecting the authorization request for the recurring transaction:
        retrieving, by the at least one computing device, a contact credential for a communication device associated with the consumer, the contact credential including an application identifier for a network-based application in the communication device;
        transmitting, by the at least one computing device, a verification request for the recurring transaction to the communication device of the consumer, via the network-based application in the communication device, based on the contact credential;
        holding, by the at least one computing device, the detected authorization request for the recurring transaction at the payment network, rather than transmitting the detected authorization request to the issuer of the payment account; and then
    receiving, by the computing device, a verification response, to the verification request, via the network-based application from the consumer, the verification response including an approval of the recurring transaction; and
    in response to: i) receiving the verification response within a predefined interval and ii) the verification response including the approval of the recurring transaction, transmitting the detected authorization request for the recurring transaction to the issuer of the payment account.

2. A non-transitory computer readable storage media including executable instructions for verifying a recurring transaction to a payment account, which when executed by at least one processor of a payment network, cause the at least one processor to:
    detect an authorization request for each of a series of recurring transactions between a merchant and a consumer defined by a recurring transaction schedule, each of the recurring transactions directed from the merchant to a payment account associated with the consumer, via an acquirer associated with the merchant, the payment account issued to the consumer by an issuer, and the authorization request for each of the recurring transactions including a payment account number for the payment account; and
    for each of the recurring transactions in the recurring transaction schedule:
        retrieve a contact credential for a communication device associated with the consumer, from memory, based on the payment account number, the contact credential including an application identifier for a network-based application in the communication device;
        transmit a verification message, to the consumer, via the network-based application at the communication device, based on the contact credential, the verification message including at least one of: an indication of the merchant and an amount of the recurring transaction; and
    when a verification response to the verification message is not received from the consumer, via the network-based application:

hold an authorization reply transmitted from the issuer of the payment account, in response to the authorization request, at the payment network rather than forward the authorization reply to the merchant, via the acquirer;

when the verification response is received from the consumer, via the network-based application, and the verification response includes an approval of the recurring transaction:

transmit the authorization reply to the merchant, via the acquirer associated with the merchant; and when the verification response is not received within a predefined interval and a default setting associated with the consumer includes a default decline setting:

append an indicator of consumer-declined transaction in the authorization reply transmitted from the issuer and transmit the authorization reply to the merchant, whereby the authorization reply indicates decline of the recurring transaction.

3. The non-transitory media of claim 2, wherein the executable instructions, when executed by the at least one processor, cause the at least one processor to:

when the verification response for the recurring transaction is received from the consumer, via the network-based application, within the predefined interval and the verification response includes a decline by the consumer, append the indicator of consumer-declined transaction in the authorization reply and permit the authorization reply transmitted from the issuer to be transmitted to the merchant via the acquirer, whereby the authorization reply indicates decline of the recurring transaction.

4. A system for use in verifying recurring transactions to payment accounts, the system comprising:

at least one computing device including a memory, the at least one computing device configured to:

detect an authorization request for a recurring transaction to a payment account, directed from a merchant involved in the recurring transaction, via an acquirer associated with the merchant, to an issuer of the payment account, the authorization request including a payment account number indicative of the payment account and a recurring transaction indicator, the recurring transaction based on a prior permission of a consumer associated with the payment account;

in response to the detected authorization request:

retrieve a contact credential for the consumer based on the payment account number, the contact credential including an application identifier for a network-based application in a communication device of the consumer;

transmit a verification request to the consumer, at the communication device of the consumer, via the network-based application, based on the contact credential, the verification request including an amount of the recurring transaction and a merchant involved in the recurring transaction; and in response to the recurring transaction being authorized by the issuer of the payment account, hold clearing of the authorized recurring transaction; and receive a verification response, to the verification request, from the consumer, via the network-based application, the verification response including an approval of the recurring transaction; and in response to receiving the verification response including the approval of the recurring transaction, clear the authorized recurring transaction.

5. The system of claim 4, wherein the at least one computing device is configured to:

when a verification response is not received from the consumer by expiration of a predefined interval, hold clearing of the authorized recurring transaction.

6. The system of claim 5, further comprising a payment network including the at least one computing device.

7. The system of claim 4, wherein the at least one computing device is further configured to:

confirm the payment account is in good standing with an issuer of the payment account; and transmit the verification request for the recurring transaction to the consumer, via the network-based application, only after confirming with the issuer the payment account is in good standing the issuer.

8. The system of claim 4, further comprising a non-transitory computer readable storage media, for use in the communication device of the consumer; and wherein the non-transitory computer readable storage media includes executable instructions defining the network-based application, which when executed by a processor of the communication device, cause the communication device to:

compile and display a verification interface, at the communication device, based on the verification request from the at least one computing device, the verification interface indicating the merchant and the amount of the recurring transaction; and transmit the verification response, for the recurring transaction, to the at least one computing device, based on a consumer input to the verification interface.

9. The system of claim 8, wherein the verification interface includes at least one of an amount and a date of a prior recurring transaction to said merchant associated with the recurring transaction.

10. The system of claim 4, wherein the at least one computing device is configured to: nullify clearing of the authorized recurring transaction in response to at least one of: the verification response not being received within a predefined interval and receiving a verification response, which includes a decline of the authorized recurring transaction.

11. A computer-implemented method for use in processing a recurring transaction, the method comprising:

detecting, by at least one computing device, an authorization request for a recurring transaction to a payment account, directed from a merchant involved in the recurring transaction, via an acquirer associated with the merchant, to an issuer of the payment account, the authorization request including a payment account number indicative of the payment account and a recurring payment indicator, and the recurring transaction submitted by the merchant based on a prior permission of a consumer; and in response to detecting the authorization request for the recurring transaction:

retrieving, by the at least one computing device, a contact credential for a communication device associated with the consumer, the contact credential including an application identifier for a network-based application in the communication device; and transmitting, by the at least one computing device, a verification request for the recurring transaction to the communication device of the consumer, via the network-based application in the communication device, based on the contact credential; and receiving an authorization reply, in which the recurring transaction is authorized by the issuer;

in response to the authorization reply for the recurring transaction, holding, by the at least one computing device, clearing of the authorized recurring transaction;

receiving, by the computing device, a verification response, to the verification request, via the network-based application, from the consumer, the verification response including an approval of the authorized recurring transaction; and in response to: i) receiving the verification response within a predefined interval and ii) the verification response including the approval of the recurring transaction, clearing the authorized recurring transaction.

12. A system for use in verifying recurring transactions to payment accounts, the system comprising:

a payment network including at least one computing device, which includes a memory having computer executable instructions, the at least one computing device configured, by the computer executable instructions, to:

detect an authorization request for a recurring transaction to a payment account, directed from a merchant involved in the recurring transaction, via an acquirer associated with the merchant, to an issuer of the payment account, the authorization request including a payment account number indicative of the payment account and a recurring transaction indicator, the recurring transaction based on a prior permission of a consumer associated with the payment account;

in response to the detected authorization request:

retrieve a contact credential for the consumer based on the payment account number, the contact credential including an application identifier for a network-based application in a communication device of the consumer;

transmit a verification request to the consumer, at the communication device of the consumer, via the network-based application, based on the contact credential, the verification request including an amount of the recurring transaction and a merchant involved in the recurring transaction; and hold the detected authorization request for the recurring transaction, at the payment network rather than transmitting the detected authorization request to the issuer; and then in response to a verification response being received from the consumer, via the network-based application, and the verification response including an approval of the recurring transaction, transmit the detected authorization request for the recurring transaction to the issuer.

13. The system of claim 12, wherein the at least one computing device is further configured to:

confirm the payment account is in good standing with an issuer of the payment account; and transmit the verification request for the recurring transaction to the consumer, via the network-based application, only after confirming with the issuer the payment account is in good standing the issuer.

14. The system of claim 12, further comprising a non-transitory computer readable storage media, for use in the communication device of the consumer; and wherein the non-transitory computer readable storage media includes executable instructions defining the network-based application, which when executed by a processor of the communication device, cause the communication device to:

compile and display a verification interface, at the communication device, based on the verification request from the at least one computing device, the verification interface indicating the merchant and the amount of the recurring transaction; and transmit the verification response, for the recurring transaction, to the at least one computing device, based on a consumer input to the verification interface.

* * * * *